(12) United States Patent
Molena et al.

(10) Patent No.: US 12,125,977 B2
(45) Date of Patent: Oct. 22, 2024

(54) SOLID ELECTROLYTE COMPOSITION

(71) Applicant: SOLVAY SPECIALTY POLYMERS ITALY S.P.A., Bollate (IT)

(72) Inventors: Elena Molena, Bollate (IT); Christine Hamon, Bollate (IT); Silvia Rita Petricci, Bresso (IT); Giulia Piana, Turin (IT); Federico Bella, Turin (IT); Claudio Gerbaldi, Turin (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 690 days.

(21) Appl. No.: 17/291,624

(22) PCT Filed: Nov. 8, 2019

(86) PCT No.: PCT/EP2019/080674
§ 371 (c)(1),
(2) Date: May 6, 2021

(87) PCT Pub. No.: WO2020/099261
PCT Pub. Date: May 22, 2020

(65) Prior Publication Data
US 2021/0408589 A1    Dec. 30, 2021

(30) Foreign Application Priority Data
Nov. 12, 2018    (EP) .................................... 18205752

(51) Int. Cl.
*H01M 10/0565*    (2010.01)
*H01M 10/0525*    (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ......... H01M 10/0565; H01M 10/0525; H01M 2300/0082; H01M 2300/0085; H01M 10/052; Y02E 60/10
See application file for complete search history.

(56) References Cited

U.S. PATENT DOCUMENTS

| 6,203,944 B1 | 3/2001 | Turner et al. | |
| 2015/0288028 A1* | 10/2015 | DeSimone | H01M 8/1025 429/402 |
| 2015/0329453 A1 | 11/2015 | Guarda et al. | |
| 2018/0323470 A1 | 11/2018 | Yang et al. | |

FOREIGN PATENT DOCUMENTS

| JP | 2004022504 | * | 1/2004 | ............... H01M 4/62 |
| JP | WO2018015417 A1 | * | 1/2018 | ......... C08G 65/2639 |
| WO | 2000003444 A1 | | 1/2000 | |
| WO | 2014090649 A1 | | 6/2014 | |

* cited by examiner

*Primary Examiner* — Helen Oi K Conley
(74) *Attorney, Agent, or Firm* — Osha Bergman Watanabe & Burton LLP

(57) ABSTRACT

The present invention relates to a solid electrolyte composition comprising:
a) at least one (per)fuoropolyether comprising a (per)fluoropolyoxyalkylene chain [chain ($R_{pf}$)] having two chain ends, wherein at least one chain end has formula (I):

$$-[CH(J)CH_2O]_{na}[CH_2CH(J)O]_{na'}-H \quad (I)$$

wherein each J is independently H, aryl, straight or branched alkyl, and na and na', equal to or different from each other, are zero or an integer from 1 to 50, with the proviso that na+na' is from 1 to 50;

b) a poly(alkylene oxide) comprising chains of formula (II):

$$R^1_B-[OCHR^1_A(CH_2)_jCHR^2_A]_n-OR^2_B \quad (II)$$

wherein each of $R^1_A$ and $R^2_A$ is independently a hydrogen atom or a $C_1$-$C_5$ alkyl group, j is zero or an integer of 1 to 2, $R^1_B$ and $R^2_B$ is independently a hydrogen atom or a $C_1$-$C_3$ alkyl group, and n is an integer from 5 to 1000, and c) at least one lithium salt.

14 Claims, No Drawings

SOLID ELECTROLYTE COMPOSITION

CROSS REFERENCE TO RELATED APPLICATIONS

This application is a U.S. national stage entry under 35 U.S.C. § 371 of International Application No. PCT/EP2019/080674 filed Nov. 8, 2019, which claims priority to European patent application No. 18205752.1 filed on Nov. 12, 2018, the whole content of this application being incorporated herein by reference for all purposes.

TECHNICAL FIELD

The present invention pertains to a solid polymer electrolyte composition, in particular for use in lithium-ion batteries.

BACKGROUND ART

Lithium-ion batteries (LIBs) have seen an increasing development in the past years due to the rising interest in the commercialization of power tools, hybrid electric vehicles, electric vehicles for the automotive industry, and portable devices for daily lives.

The electrolyte is a critical component for long lifespan and high performances LIBs. The electrolyte should be able to provide suitable ionic conductivity and maintain good chemical stability and compatibility with electrode materials. For practical applications, the ionic conductivity of electrolytes must exceed $10^{-5}$ S/cm at room temperature. Furthermore, the electrolyte should have a Li$^+$ transference number approaching unity to avoid concentration gradient during charge and discharge cycles.

Solid polymer electrolytes (SPEs)—which are solvent-free electrolytes based on polymers—are becoming increasingly attractive for use in next-generation LIBs, which currently contain a liquid electrolyte. Replacing the liquid electrolyte has several advantages: it allows use of higher-energy density solid lithium at the anode, removes toxic solvents, improves cycling ability, and eliminates the need for heavy casings. Despite the advantages of SPEs, their conductivity is not sufficient for use in batteries. As a result, considerable efforts towards improving their conductivity have taken place over the last 20 years.

SPEs are usually composed of two components, namely a polymer matrix and a lithium salt, which are the key factors that affect the ionic conductivity. High ionic conductivity is generally associated with the amorphous phase of the polymer matrix, which is in turn associated with its glass transition temperature ($T_g$).

The most performing lithium salt is lithium bis(trifluoromethane)sulfonimide (LiTFSI) thanks to its high solubility in the polymer matrix, ionic conductivity, electrochemical stability and dissociation level.

The ideal polymer matrix should have strong ability of solvating lithium ions, have a low $T_g$ to remain rubbery at ambient temperature and possess limited crystallinity in the temperature range of operations to preserve a lithium ion conductivity substantially similar to that of the liquid electrolyte systems ($10^{-3}$ S/cm).

Poly(ethylene oxide) (PEO) has been considered as the most promising polymer matrix thanks to its unique capacity to solvate lithium ions and a $T_g$ as low as about $-67°$ C. Due to the presence of crystalline domains in PEO below PEO crystalline melting point (about 65° C.), PEO-based SPEs can only operate at higher temperatures.

Extensive studies have been made for tuning the PEO-based electrolyte properties, providing more precise control of crystalline melting and glass transition temperature properties, increasing the lithium ion mobility and increasing the ionic conductivity in the temperature range of operation.

In this respect, numerous polyether-based crosslinked polymer electrolytes have been studied. For instance, US 2015/0288028 discloses a solid polymer comprising a crosslinked product of a crosslinkable perfluoropolyether (e.g. perfluoropolyether dimethacrylate, PFPE-DMA) and a crosslinkable PEO (e.g. poly(ethylene glycol) dimethacrylate, PEO-DMA) and a lithium salt dissolved in said polymer for use in LIBs.

However, said polymer did not show appreciable ionic conductivity and batteries using said polymer did not reveal to be performing enough.

Need is therefore felt to provide SPEs possessing improved ionic conductivity in the temperature range of operation and also providing good performances of the LIBs, in particular in terms of specific discharge capacity.

SUMMARY OF INVENTION

In a first aspect, the present invention relates to a solid electrolyte composition [composition (C)] comprising:

a) at least one (per)fuoropolyether (PFPE) comprising a (per)fluoropolyoxyalkylene chain [chain ($R_pf$)] having two chain ends, wherein at least one chain end has formula (I):

wherein:
each J is independently H, aryl, straight or branched alkyl, and na and na', equal to or different from each other, are zero or integers from 1 to 50, with the proviso that na+na' is from 1 to 50;

b) a poly(alkylene) oxide comprising chains of formula (II):

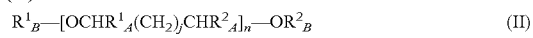

wherein:
each of $R^1_A$ and $R^2_A$, equal to or different from each other at each occurrence, is independently a hydrogen atom or a $C_1$-$C_5$ alkyl group; j is zero or an integer of 1 to 2;
each of $R^1_B$ and $R^2_B$, equal to or different from each other at each occurrence, is independently a hydrogen atom or a $C_1$-$C_3$ alkyl group, preferably a $CH_3$ group, and
n is an integer from 5 to 1000, and c) at least one lithium salt.

In a second aspect, the present invention relates to a method for making the above composition (C), said method comprising:

i. melting said poly(alkylene oxide), thus obtaining melt poly(alkylene oxide);

ii. dissolving said at least one lithium salt and said at least one (per)fuoropolyether (PFPE) into melt poly(alkylene oxide), thus obtaining a solution;

iii. cooling down said solution, thus obtaining said solid composition (C).

In a third aspect, the present invention relates to a method for making the above composition (C), said method comprising:

i. dissolving said poly(alkylene oxide), said at least one lithium salt and said at least one (per)fuoropolyether (PFPE) in a solvent, preferably acetonitrile, thus obtaining a solution;

ii. evaporating the solvent from said solution, thus obtaining said solid composition (C).

In a further aspect, the present invention relates to a lithium-ion battery (LIB) comprising at least one anode, at least one cathode and a solid electrolyte comprising, preferably consisting of, composition (C) as defined above.

The Applicant has surprisingly found that composition (C) of the invention provides an outstanding ionic conductivity and a significant specific discharge capacity of the LIBs, which are much higher than the prior art crosslinked polyether-based crosslinked electrolytes.

DETAILED DESCRIPTION OF THE INVENTION

In the present description, unless otherwise indicated, the following terms are to be meant as follows.

The term "(per)fluoropolyether" is intended to indicate fully or partially fluorinated polyether polymers.

The acronym "PFPE" stands for "(per)fluoropolyether" and, when used as substantive, is intended to mean either the singular or the plural form, depending on the context.

The acronym "PEO" stands for "polyethylene oxide".

The expression "EO:Li ratio" is intended to indicate the molar ratio between the repeating units in the poly(alkylene oxide), e.g. ethylene oxide moieties, and the lithium ions.

The expression "average functionality (F)" denotes the average number of functional groups per polymer molecule and can be calculated according to methods known in the art.

In the present description, the use of parentheses "( . . . )" before and after the names of compounds, symbols or numbers identifying formulae or parts of formulae, such as "composition (C)", has the mere purpose of better distinguishing those names, symbols or numbers from the remaining text; thus, said parentheses could also be omitted.

Preferably, said chain ($R_pf$) is a chain of formula (II):

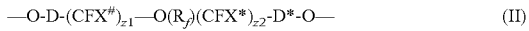
—O-D-(CFX$^\#$)$_{z1}$—O(R$_f$)(CFX*)$_{z2}$-D*-O— (II)

wherein:
z1 and z2, equal or different from each other, are integers equal to or higher than 1;
X$^\#$ and X*, equal or different from each other, are —F or —CF$_3$, provided that when z1 and/or z2 are higher than 1, X$^\#$ and X* are —F;
D and D*, equal or different from each other, are alkylene chains comprising from 1 to 6 carbon atoms, preferably from 1 to 3, said alkylene chains being optionally substituted with at least one perfluoroalkyl group comprising from 1 to 3 carbon atoms;
R$_f$ comprises, preferably consists of, repeating units independently selected from the group consisting of:
(i) —CFXO—, wherein X is F or CF$_3$;
(ii) —CFXCFXO—, wherein X, equal or different at each occurrence, is F or CF$_3$, with the proviso that at least one X is —F;
(iii) —CF$_2$CF$_2$CW$_2$O—, wherein each W, equal or different from each other, is F, Cl, H;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each X being independently F or CF$_3$ and T being a C$_1$-C$_3$ perfluoroalkyl group.

Preferably, z1 and z2, equal or different from each other, are integers from 1 to 10, more preferably from 1 to 6 and even more preferably from 1 to 3.

Preferably, D and D*, equal or different from each other, are chains of formula —CH$_2$—, —CH$_2$CH$_2$— or —CH(CF$_3$)—.

Preferably, said chain (R$_f$) complies with the following formula:

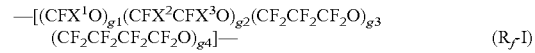
—[(CFX$^1$O)$_{g1}$(CFX$^2$CFX$^3$O)$_{g2}$(CF$_2$CF$_2$CF$_2$O)$_{g3}$ (CF$_2$CF$_2$CF$_2$O)$_{g4}$]— (R$_f$-I)

wherein
X$^1$ is independently selected from —F and —CF$_3$,
X$^2$, X$^3$, equal or different from each other and at each occurrence, are independently —F, —CF$_3$, with the proviso that at least one X is —F;
g1, g2, g3, and g4, equal or different from each other, are independently integers≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, said chain (R$_f$) is selected from chains of formula:

—[(CF$_2$CF$_2$O)$_{a1}$(CF$_2$O)$_{a2}$]— (R$_f$-IIA)

wherein:
a1 and a2 are independently integers≥0 such that the number average molecular weight is between 400 and 10,000, preferably between 400 and 5,000; both a1 and a2 are preferably different from zero, with the ratio a1/a2 being preferably comprised between 0.1 and 10;

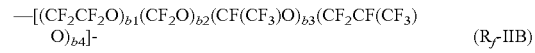
—[(CF$_2$CF$_2$O)$_{b1}$(CF$_2$O)$_{b2}$(CF(CF$_3$)O)$_{b3}$(CF$_2$CF(CF$_3$) O)$_{b4}$]- (R$_f$-IIB)

wherein:
b1, b2, b3, b4 are independently integers 0 such that the number average molecular weight is between 400 and 10,000, preferably between 400 and 5,000; preferably b1 is 0, b2, b3, b4 are >0, with the ratio b4/(b2+b3) being ≥1;

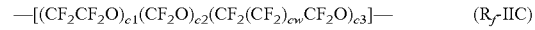
—[(CF$_2$CF$_2$O)$_{c1}$(CF$_2$O)$_{c2}$(CF$_2$(CF$_2$)$_{cw}$CF$_2$O)$_{c3}$]— (R$_f$-IIC)

wherein:
cw is 1 or 2;
c1, c2, and c3 are independently integers 0 chosen so that the number average molecular weight is between 400 and 10,000, preferably between 400 and 5,000; preferably c1, c2 and c3 are all >0, with the ratio c3/(c1+c2) being generally lower than 0.2;

—[(CF$_2$CF(CF$_3$)O)$_d$]— (R$_f$-IID)

wherein:
d is an integer >0 such that the number average molecular weight is between 400 and 10,000, preferably between 400 and 5,000;

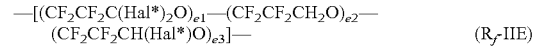
—[(CF$_2$CF$_2$C(Hal*)$_2$O)$_{e1}$—(CF$_2$CF$_2$CH$_2$O)$_{e2}$— (CF$_2$CF$_2$CH(Hal*)O)$_{e3}$]— (R$_f$-IIE)

wherein:
Hal*, equal or different at each occurrence, is a halogen selected from fluorine and chlorine atoms, preferably a fluorine atom;
e1, e2, and e3, equal to or different from each other, are independently integers 0 such that the (e1+e2+e3) sum is comprised between 2 and 300.

Still more preferably, said chain ($R_f$) complies with formula ($R_f$-III) here below:

$$—[(CF_2CF_2O)_{a1}(CF_2O)_{a2}]— \quad (R_f\text{-III})$$

wherein:
a1, and a2 are integers >0 such that the number average molecular weight is between 400 and 10,000, preferably between 400 and 5,000, with the ratio a1/a2 being generally comprised between 0.1 and 10, more preferably between 0.2 and 5.

Preferably, in the at least one chain end of formula (I), na+na' is from 1 to 45, more preferably from 4 to 45, even more preferably from 4 to 30. Preferred embodiments are those wherein na+na' is from 4 to 15.

More preferably, said at least one chain end complies with one of the following formulae (I-a), (I-b), (I-c):

$$—(CH_2CH_2O)_{j1}—H \quad (I\text{-a})$$

$$—[CH_2CH(CH_3)O]_{j2}—H \quad (I\text{-b})$$

$$—[(CH_2CH_2O)_{j3}—(CH_2CH(CH_3)O)_{j4}]_{j(x)}—H \quad (I\text{-c})$$

wherein:
j1 and j2, each independently, are integers from 1 to 50, preferably from 2 to 50, more preferably from 3 to 40, even more preferably from 4 to 15, and still more preferably from 4 to 10;
j3, j4 and j(x) are integers from 1 to 25, such that the sum of j3 and j4 is from 2 to 50, more preferably from 3 to 40, even more preferably from 4 to 15, and still more preferably from 4 to 10.

The recurring units having j3 and j4 as indexes can be either randomly distributed or they can be arranged to form blocks.

Said PFPEs are commercially available from Solvay Specialty Polymers (Italy) and can be obtained according to the method disclosed in WO 2014/090649 (SOLVAY SPECIALTY POLYMERS ITALY S.P.A.).

According to a preferred embodiment, the chains of the poly(alkylene oxide) have formula (II-A):

$$CH_3—[OCH_2CH_2]_{n1}—OCH_3 \quad (II\text{-A})$$

with n1 being an integer from 5 to 500, preferably from 6 to 400, more preferably from 8 to 300, even more preferably from 10 to 150.

According to another embodiment, the chains of the poly(alkylene oxide) have formula (II-B):

$$CH_3—(C_3H_6O)_{nP}(CH_2CH_2O)_{nE}—OCH_3 \quad (II\text{-B})$$

with nE being an integer from 1 to 100, preferably from 1 to 50, more preferably from 1 to 30, and nP being an integer from 1 to 120, preferably from 1 to 80, more preferably from 1 to 50, wherein units of formula —$C_3H_6O$— may be units —$CH_2CH(CH_3)O$—, —$CH(CH_3)CH_2O$— or —$CH_2CH_2CH_2O$—.

Preferably, said at least one lithium salt is selected from the group comprising: $LiPF_6$, $LiBF_4$, $LiClO_4$, lithium bis(oxalato)borate ("LiBOB"), $LiN(CF_3SO_2)_2$ ("LiTFSI"), $LiN(C_2F_6SO_2)_2$, $M[N(CF_3SO_2)(R_FSO_2)]_n$ with RF being $C_2F_6$, $C_4F_9$, $CF_3OCF_2CF_2$, $LiAsF_6$, $LiC(CF_3SO_2)_3$, 4,5-dicyano-2-(trifluoromethyl) imidazole ("LiTDI"), and combinations or mixtures thereof. More preferably, said lithium salt is $LiN(CF_3SO_2)_2$ ("LiTFSI").

Composition (C) comprises said at least one lithium salt in an amount preferably ranging from 5 to 30 wt. %, more preferably from 10 to 30 wt. %, even more preferably from 15 to 30 wt. %.

Composition (C) comprises said at least one PFPE in an amount preferably ranging from 10 to 50 wt. %, more preferably from 15 to 40 wt. %, even more preferably from 15 to 30 wt. %.

The concentration of the at least one lithium salt in said composition (C) is expressed in terms of EO:$Li^+$ ratio. Said EO:$Li^+$ ratio preferably ranges from 10:1 to 30:1, more preferably from 15:1 to 20:1.

As said, the present invention also relates to a lithium ion battery comprising at least one anode, at least one cathode and a solid electrolyte comprising, preferably consisting of, the above identified composition (C).

Suitable active materials for the anode (negative electrode) are selected from the group consisting of:
graphitic carbons able to intercalate lithium, typically existing in forms such as powders, flakes, fibers or spheres (for example mesocarbon microbeads) hosting lithium;
lithium metal;
lithium alloy composition, including notably those described in U.S. Pat. No. 6,203,944 (3M INNOVATIVE PROPERTIES) and/or in WO 00/03444 (MINNESOTA MINING);
lithium titanates, generally represented by formula $Li_4Ti_6O_{12}$, these compounds are generally considered as "zero-strain" insertion materials, having low level of physical expansion upon taking up the mobile ions, i.e. $Li^+$;
lithium-silicon alloys, generally known as lithium silicides with high Li/Si ratios, in particular lithium silicides of formula $Li_{4.4}Si$;
lithium-germanium alloys, including crystalline phases of formula $Li_{4.4}Ge$.

The anode may contain additives as will be familiar to those skilled in the art. Among them, mention can be made notably of carbon black, graphene or carbon nanotubes. As will be appreciated by those skilled in the art, the negative electrode may be in any convenient form including foils, plates, rods, pastes or as a composite made by forming a coating of the negative electrode material on a conductive current collector or other suitable support.

Representative cathode (positive electrode) materials for lithium batteries include composites comprising a polymer binder (PB), a powdery electrode material, an electroconductivity-imparting additive and, optionally, a viscosity modifying agent. Said electroconductivity-imparting additive may be selected among: carbonaceous materials, such as carbon black, graphite fine powder and fiber, and fine powder and fiber of metals, such as nickel and aluminum.

The active material for the positive electrode preferably comprises a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_{1-x}O_2$ (0<x<1), and spinel-structured $LiMn_2O_4$.

As an alternative, the active material may comprise a lithiated or partially lithiated transition metal oxyanion-based electro-active material of formula $$M1M2(JO4)_fE_{1-f}$$

wherein

M1 is lithium, which may be partially substituted by another alkali metal representing less than 20% of the M1 metals, M2 is a transition metal at the oxidation level of +2 selected from Fe, Mn, Ni or mixtures thereof, which may be partially substituted by one or more additional metals at oxidation levels between +1 and +5 and representing less than 35% of the M2 metals, including 0, JO4 is any oxyanion wherein J is either P, S, V, Si, Nb, Mo or a combination thereof, E is a fluoride, hydroxide or chloride anion, f is the molar fraction of the JO4 oxyanion, generally comprised between 0.75 and 1.

The $M1M2(JO4)_fE_{1-f}$ electro-active material as defined above is preferably phosphate-based and may have an ordered or modified olivine structure.

More preferably, the active material is a phosphate-based electro-active material of formula $Li(Fe_xMn_{1-x})PO_4$ wherein $0 \leq x \leq 1$, wherein x is preferably 1 (i.e. lithium iron phosphate of formula $LiFePO_4$).

As per the polymer binder (PB), polymers well known in the art can be used including, preferably, vinylidene fluoride (VDF) polymers.

Should the disclosure of any patents, patent applications and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

Experimental Section

Materials

Lithium bis(trifluoromethan)sulfonimide (LiTFSI) was obtained from Special Chem.

Poly(ethylenoxide) (PEO): $CH_3$—[$OCH_2CH_2$]$_{n1}$—$OCH_3$ (with n1 being an integer such that a) Mn=150'000 and b) Mn=15'000) was obtained from Mesei Chem.

SYNTHESIS EXAMPLES

PFPE(I) complying with formula:

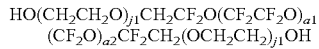

wherein j1=7, the ratio a1/a2=1.2, the average number molecular weight (Mn)=2,200 and F=1.8, was manufactured according to the procedure disclosed in WO 2014/090649.

PFPE(II) complying with formula:

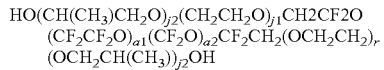

wherein j1=8.5, j2=4.5, the ratio a1/a2=1.2, the average number molecular weight (Mn)=2,900 and F=1.8, was manufactured according to the procedure disclosed in WO 2014/090649.

PFPE(III) complying with formula:

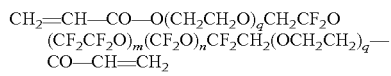

wherein q=4.8, n/m=1.3 and the average number molecular weight (Mn)=2171 was manufactured starting from the respective hydroxy-terminated PFPE, according to the following procedure. The hydroxy-terminated PFPE (12.4 g, 0.01 eq) was dissolved in hexafluoroxylene (10 ml) under a nitrogen stream. Di-isopropylamine (1.61 g, 0.013 eq) was then added to the resulting solution. Said solution was stirred for 30 minutes at room temperature and then acryloyl chloride (0.27 g, 4.3 mmol) was added dropwise in an ice bath. After completion of the reaction as monitored by $H^1$—NMR, the solution was distilled under vacuum to remove the hexafluoroxylene and the reaction product was washed with distilled water (50 ml×2), dried with anhydrous $Mg_2SO_4$ and filtered. The reaction product (11.4 g) was obtained with a yield of 90%.

Manufacture of Membranes

Example 1

PEO (Mn 150'000), PFPE(I) and PFPE(II) were dried overnight at 55° C. under vacuum and were stored in a dry glove box.

LiTFSI was mixed with PFPE(I) or PFPE(II), according to different examples, in a beaker inside the glove box, obtaining a first mixture. Then, PEO was added to said first mixture and mixed with a spatula, thus enabling the magnetic stirring of the powders and obtaining a second mixture.

Said second mixture was heated at 80° C. for 1-2 hours until melting, mechanically mixed in a mortar twice and then cooled, obtaining a white and flexible paste.

Said paste was pressed at 60° C. and 20 bar for 15 minutes between two Halar® foils, thus obtaining a membrane with a thickness of between 175 and 190 μm.

The following membranes 1A and 1B were obtained:

TABLE 1

| | EO/Li | PEO:PFPE | PEO | PFPE(I) | PFPE(II) | LiTFSI |
|---|---|---|---|---|---|---|
| 1A | 15:1 | 70:30 | 49%(wt) | 30%(wt) | — | 21%(wt) |
| 1B | 15:1 | 70:30 | 49%(wt) | — | 30%(wt) | 21%(wt) |

Example 2 of Comparison

PFPE(III), PEO (Mn 15'000) and LiTFSI were dried overnight at 55° C. under vacuum and were stored in a dry glove box.

LiTFSI was mixed with PFPE(III) in a beaker inside the glove box, obtaining a first mixture. Then, PEO was added to said first mixture and mixed with a spatula, thus enabling the magnetic stirring of the powders and obtaining a second mixture.

Said second mixture was heated at 60-70° C. for at least 3 hours until melting and then mechanically mixed twice in a mortar, thus obtaining a homogeneous solution.

While still hot, said solution was pressed at 70° C., 20 bar for 15 minutes between 2 Halar foils separated by a tape-made spacer, thus obtaining a membrane with a thickness raging between 120 and 160 μm.

Said membrane was cooled at room temperature, then mixed with one or more photo-initiators and subsequently subjected to UV-curing under a continuous flow of nitrogen.

By varying the photo-initiator and the UV time, i.e. the time of exposure of the membranes to UV light, the following cross-linked membranes 2A to 2C were obtained.

TABLE 2

|  | EO/Li | PEO:PFPE | PEO | PFPE(III) | LiTFSI | Photo-initiator (*) | UV time |
|---|---|---|---|---|---|---|---|
| 2A | 15:1 | 70:30 | 51%(wt) | 23%(wt) | 26%(wt) | 3%(wt) Dar | 3 min |
| 2B | 15:1 | 70:30 | 51%(wt) | 23%(wt) | 26%(wt) | 3%(wt) Dar | 15 min |
| 2C | 15:1 | 70:30 | 51%(wt) | 23%(wt) | 26%(wt) | 3%(wt) Dar + 3%(wt) BP | 15 min |

(*) Dar: Darocur 1173/BP: Benzophenone

Ionic Conductivity

Table 3 shows the values of ionic conductivity at 80° C. ($\sigma_{80}$) of the membranes of example 1 and the membranes of example 2 of comparison.

TABLE 3

|  | 1A | 1B | 2A | 2B | 2C |
|---|---|---|---|---|---|
| $\sigma_{80}$ (S · cm$^{-1}$) | 9.6 · 10$^{-4}$ | 1.0 · 10$^{-3}$ | 3.7 · 10$^{-4}$ | 2.3 · 10$^{-4}$ | 2.9 · 10$^{-4}$ |

The above results show that membranes 1A and 1B provide a significantly higher ionic conductivity than membranes 2A-2C.

Specific Discharge Capacity

Membranes 1A, 1B and 2C were tested in a Li/electrolyte/LiFePO$_4$ battery. The parameters used were the following: temperature of 80° C., discharge rate of 2D, cathode capacity of 0.33 mAh, cathode composition 70% (wt) LiFePO$_4$, 20% (wt) carbon black and 10% (wt) PVDF, and loading of about 2 mg/cm$^2$.

Table 4 shows the values of the specific discharge capacity at 2D average on 20 cycles.

TABLE 4

|  | 1A | 1B | 2C |
|---|---|---|---|
| Specific discharge capacity (mAh/g) | 85 | 63 | <20 |

From the above values, it results that batteries prepared with membranes 1A and 1B show much better performances than batteries prepared with cross-linked membranes, such as membrane 2C.

The invention claimed is:

1. A solid electrolyte composition [composition (C)], comprising:
   a) at least one (per)fluoropolyether (PFPE) comprising a (per)fluoropolyoxyalkylene chain [chain (R$_{pf}$)] having two chain ends, wherein at least one chain end has formula (I):

—[CH(J)CH$_2$O]$_{na}$[CH$_2$CH(J)O]$_{na'}$—H     (I)

wherein:
   each J is independently H, aryl, straight or branched alkyl, and
   na and na', equal to or different from each other, are zero or an integer from 1 to 50, with the proviso that na+na' is from 1 to 50;

b) a poly(alkylene oxide) comprising chains complying with formula (II):

R$^1_B$—[OCHR$^1_A$(CH$_2$)$_j$CHR$^2_A$]$_n$—OR$^2_B$     (II)

wherein:
   each of R$^1_A$ and R$^2_A$, equal to or different from each other at each occurrence, is independently a hydrogen atom or a C1-C$_5$ alkyl group;

j is zero or an integer of 1 to 2;
   each of R$^1_B$ and R$^2_B$, equal to or different from each other at each occurrence, is independently a hydrogen atom or a C1-C$_3$ alkyl group, and
   n is an integer from 5 to 1000, and
   at least one lithium salt.

2. The composition according to claim 1, wherein said chain (Rpf) is a chain of formula (II):

—O-D-(CFX#)$_{z1}$-O(R$_f$)(CFX*)$_{z2}$-D*-O—     (II)

wherein:
   z1 and z2, equal or different from each other, are integers equal to or higher than 1;
   X# and X*, equal or different from each other, are —F or —CF$_3$, provided that when z1 and/or z2 are higher than 1, X# and X* are —F;
   D and D*, equal or different from each other, are alkylene chains comprising from 1 to 6 carbon atoms, said alkylene chains being optionally substituted with at least one perfluoroalkyl group comprising from 1 to 3 carbon atoms;
   Rr comprises repeating units independently selected from the group consisting of:
   (i) —CFXO—, wherein X is F or CF$_3$;
   (ii) —CFXCFXO—, wherein X, equal or different at each occurrence, is F or CF$_3$, with the proviso that at least one X is-F;
   (iii) —CF$_2$CF$_2$CW$_2$O—, wherein each W, equal or different from each other, is F, Cl or H,
   (iv) —CF$_2$CF$_2$CF$_2$CF$_2$O—;
   (v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being selected from the group consisting of: —CFXO—, —CF$_2$CFXO—, —CF$_2$CF$_2$CF$_2$O—, and —CF$_2$CF$_2$CF$_2$CF$_2$O—, with each X being independently F or CF$_3$ and T being a C$_1$-C$_3$ perfluoroalkyl group.

3. The composition (C) according to claim 2, wherein said chain (R$_f$) is selected from chains of formula:

—[CF$_2$CF$_2$O)$_{a1}$—(CF$_2$O)$_{a2}$)]     (Rf-IIA)

wherein:
   a1 and a2 are independently integers 0 such that the number average molecular weight is between 400 and 10,000, —[(CF$_2$CF$_2$O)$_{b1}$(CF$_2$O)$_{b2}$(CF(CF$_3$)O)$_{b3}$(CF$_2$CF(CF$_3$)O)$_{b4}$]—     (Rf-IIB)

wherein:
   b1, b2, b3, b4 are independently integers 0 such that the number average molecular weight is between 400 and 10,000;

—[(CF$_2$CF$_2$O)$_{c1}$(CF$_2$O)$_{c2}$(CF$_2$(CF$_2$)$_{cw}$CF$_2$O)$_{c3}$]—     (Rf-IIC)

wherein:
cw is 1 or 2;
c1, c2, and c3 are independently integers ≥0 chosen so that the number average molecular weight is between 400 and 10,000;

—[(CF$_2$CF(CF$_3$)O)$_d$]—     (Rf-IID)

wherein:
d is an integer >0 such that the number average molecular weight is between 400 and 10,000;

—[(CF$_2$CF$_2$C(Hal*)$_2$O)$_{e1}$—(CF$_2$CF$_2$CH$_2$O)$_{e2}$—(CF$_2$CF$_2$CH(Hal*)O)$_{e3}$]—     (Rf-IIE)

wherein:
Hal*, equal or different at each occurrence, is a halogen selected from fluorine and chlorine atoms;
e1, e2, and e3, equal to or different from each other, are independently integers ≥0 such that the (e1+e2+e3) sum is comprised between 2 and 300.

4. The composition (C) according to claim 1, wherein said at least one chain end complies with one of the following formulae (I-a), (I-b), (I-c):

—(CH$_2$CH$_2$O)$_{j1}$-H     (I-a)

—[CH$_2$CH(CH$_3$)O]$_{j2}$—H     (I-b)

—[(CH$_2$CH$_2$O)$_{j3}$—(CH$_2$CH(CH$_3$)O)$_{j4}$]$_{j(x)}$—H     (I-c)

wherein:
j1 and j2, each independently, are integers from 1 to 50;
j3, j4 and j(x) are integers from 1 to 25, such that the sum of j3 and j4 is from 2 to 50.

5. The composition (C) according to claim 1, wherein said poly(alkylene oxide) chains comply with formula (II-A):

CH$_3$—[OCH$_2$CH$_2$]$_{n1}$—OCH$_3$     (II-A)

with n1 being an integer from 5 to 500.

6. The composition (C) according to claim 1, wherein said poly(alkylene oxide) chains comply with formula (II-B):

CH$_3$—(C$_3$H$_6$O)$_{nP}$(CH$_2$CH$_2$O)$_{nE}$—OCH$_3$     (II-B)

with nE being an integer from 1 to 100, and nP being an integer from 1 to 120, wherein units of formula —C$_3$H$_6$O— may be units —CH$_2$CH(CH$_3$)O—, —CH(CH$_3$)CH$_2$O— or —CH$_2$CH$_2$CH$_2$O—.

7. The composition (C) according to claim 1, wherein said at least one lithium salt is selected from the group comprising: LiPF$_6$, LiBF$_4$, LiClO$_4$, lithium bis(oxalato)borate ("LiBOB"), LiN(CF$_3$SO$_2$)$_2$ (LiTFSI), LiN(C$_2$F$_5$SO$_2$)$_2$, M[N(CF$_3$SO$_2$)(R$_F$SO$_2$)]$_n$ with RF being C$_2$F$_5$, C$_4$F$_9$, CF$_3$OCF$_2$CF$_2$, LiAsF$_6$, LiC(CF$_3$SO$_2$)$_3$, 4,5-dicyano-2-(trifluoromethyl) imidazole (LiTDI), and combinations or mixtures thereof.

8. The composition (C) according to claim 1, wherein said at least one lithium salt is in an amount from 5 to 30 wt %.

9. The composition (C) according to claim 1, wherein said at least one (per)fluoropolyether (PFPE) is in an amount from 10 to 50 wt %.

10. A method for making the composition (C) according to claim 1, comprising:
i. melting said poly(alkylene oxide), thus obtaining melt poly(alkylene oxide);
ii. dissolving said at least one lithium salt and said at least one (per)fluoropolyether (PFPE) into melt poly(alkylene oxide), thus obtaining a solution; and
iii. cooling down said solution, thus obtaining said solid composition (C).

11. A method for making the composition (C) according to claim 1, comprising:
i. dissolving said poly(alkylene oxide), said at least one lithium salt and said at least one (per)fluoropolyether (PFPE) in a solvent, thus obtaining a solution; and
ii. evaporating the solvent from said solution, thus obtaining said solid composition (C).

12. The method according to claim 11, wherein said solvent is acetonitrile.

13. A lithium-ion battery comprising at least one anode, at least one cathode and a solid electrolyte comprising the composition (C), according to claim 1.

14. The composition (C) according to claim 3, wherein said chain (Rf) is selected from chains of formula:

—[(CF$_2$CF$_2$O)$_{a1}$(CF$_2$O)$_{a2}$]—     (Rf-IIA)

wherein both a1 and a2 are different from zero, with the ratio a1/a2 being comprised between 0.1 and 10;

—[(CF$_2$CF$_2$O)$_{b1}$(CF$_2$O)$_{b2}$(CF(CF$_3$)O)$_{b3}$(CF$_2$CF(CF$_3$)O)$_{b4}$]—     (Rf-IIB)

wherein b1 is 0, and b2, b3, b4 are >0, with the ratio b4/(b2+b3) being ≥1;

—[(CF$_2$CF$_2$O)$_{c1}$(CF$_2$O)$_{c2}$(CF$_2$(CF$_2$)$_{cw}$CF$_2$O)$_{c3}$]—     (Rf-IIC)

wherein c1, c2 and c3 are all >0, with the ratio c3/(c1+c2) being generally lower than 0.2;

—[(CF$_2$CF(CF$_3$)O)$_d$]—     (Rf-IID)

wherein d is an integer >0 such that the number average molecular weight is between 400 and 5,000;
or —[(CF$_2$CF$_2$C(Hal*)$_2$O)$_{e1}$—(CF$_2$CF$_2$CH$_2$O)$_{e2}$—(CF$_2$CF$_2$CH(Hal*)O)$_{e3}$]—     (Rf-IIE)

wherein:
Hal*, equal or different at each occurrence, is a halogen selected from fluorine and chlorine atoms;
e1, e2, and e3, equal to or different from each other, are independently integers ≥0 such that the (e1+e2+e3) sum is comprised between 2 and 300.

* * * * *